United States Patent
Bohm et al.

[11] 3,822,568
[45] July 9, 1974

[54] FLEXIBLE SHAFT COUPLING

[75] Inventors: Heinz-Dieter Bohm, Unna; Werner Ruggen, Holzwickede; Herbert Krellmann, Rhynern; Wilhelm Schluckebier, Unna-Uelzen, all of Germany

[73] Assignee: Maschinenfabrik Stromag G.m.b.H., Unna, Germany

[22] Filed: May 7, 1971

[21] Appl. No.: 141,048

[30] Foreign Application Priority Data
May 8, 1970 Germany.......................... 2022527

[52] U.S. Cl.............................. 64/11 R, 64/27 NM
[51] Int. Cl............................................. F16d 3/18
[58] Field of Search ................ 64/11 R, 13, 27 NM

[56] References Cited
UNITED STATES PATENTS

| | | | |
|---|---|---|---|
| 3,074,254 | 1/1963 | Jones, Sr........................... | 64/11 |
| 3,138,012 | 6/1964 | Smirl............................... | 64/27 NM |
| 3,557,573 | 1/1971 | Hansgen........................... | 64/13 |

Primary Examiner—Kenneth W. Sprague
Attorney, Agent, or Firm—Erwin Salzer

[57] ABSTRACT

A flexible shaft coupling including a pair of coupling members of which one is provided with a coupling flange, a substantially disc-shaped torque-transmitting member of a resilient or rubber-like material for transmitting torques from one of said pair of coupling members to the other, and clamping means for clamping a zone of said torque-transmitting member against said clamping flange. The coupling is provided with means for causing a progressive decrease of the coefficient of friction between said torque-transmitting member, said clamping flange and said clamping means in radial direction.

7 Claims, 8 Drawing Figures

PATENTED JUL 9 1974   3,822,568

INVENTORS:
Heinz-Dieter BÖHM, Werner RÜGGEN
Herbert KRELLMANN
Wilhelm SCHLUCKEBIER By   *[signature]* their ATTORNEY

FLEXIBLE SHAFT COUPLING

BACKGROUND OF THE INVENTION

There are two classes of flexible couplings which are predicated on an elastomeric or rubberlike torque-transmitting member for transmitting torques from one of a pair of coupling members to the other.

In one of these two classes the torque-transmitting member is substantially annular and substantially U-shaped in cross-section. Each of both coupling members is provided with a coupling flange and the coupling includes a pair of clamping rings by each of which one of the flange portions of the torque-transmitting member is clamped against the coupling flange of one of said pair of coupling members. A coupling of this description is disclosed in the copending patent application of Werner Ruggen et al., filed Sept. 4, 1970, Ser. No. 69,581 for FLEXIBLE COUPLING HAVING FRICTION-INCREASING MEANS, assigned to the same assignee as the present patent application. In couplings of the class described in the above referred-to copending patent application there may be slippage between the torque-transmitting member and the parts against which the latter is clamped if the torque to be transmitted is relatively high, and the pressure to which the torque-transmitting member is subjected is relatively moderate. If the pressure to which the torque-transmitting member is subjected is increased to the extent necessary to avoid slippage, the danger of damage to the torque-transmitting member arises since the elastomers, or rubber-like materials, of which the torque-transmitting member is made are only capable of withstanding relatively limited pressures. The above referred-to copending patent application proposes in order to limit pressure upon the torque-transmitting member and yet avoid slippage, to interpose between the torque-transmitting member and the means between which the latter is clamped an intermediate layer tending to increase the coefficient of friction, and thus allowing to keep the clamping pressure within safe limits, though the torque to be transmitted may be large.

In the other of the aforementioned classes of flexible couplings having an elastomeric, or rubber-like, torque-transmitting member, the latter is substantially in the shape of a disk, or disk-shaped. One of its sides is clamped against the coupling flange of one of a pair of coupling members, and the other of its sides, or its outer periphery, has a torque-transmitting engagement with the other of said pair of coupling members. In other words, the torque-transmitting member has substantially the shape of a disk, the general plane of which is arranged at right angles to a pair of shafts intended to be coupled by the coupling, so that torques are transmitted from one to the other of the pair of shafts. In flexible couplings of that kind there is a danger of destruction of, or damage to, the torque-transmitting member which is made of an elastomer, or rubber-like substance. This danger is, however, due to other causes than in the case of flexible couplings of the kind disclosed in the aforementioned copending patent application. A disc-shaped torque-transmitting member is subject to relatively extensive deformations when transmitting torques, and when oscillating while performing its torque-transmitting duty. These extensive deformations occur also in the region where the torque-transmitting member is clamped between a clamping flange and other clamping means such as, for instance, a clamping ring. In other words, the torque-transmitting member is caused to move relative to its clamping means and these relative motions of the area of the torque-transmitting member which is under clamping pressure relative to the means which exert the clamping pressure are the cause for the excessive wear and tear, or the damage, which occurs to substantially disc-shaped torque-transmitting members of flexible couplings.

SUMMARY OF THE INVENTION

This invention consists, in essence, in providing means causing a progressive variation of the coefficient of friction between the torque-transmitting member, the clamping flange of one of the coupling members of the coupling, and the clamping means for clamping the disc-shaped torque-transmitting member against the aforementioned coupling flange. These means cause a grading of the coefficient of friction in radial direction, the coefficient of friction being largest at the area where the depth of clamping of the torque-transmitting member is largest and decreasing radially inwardly and being smallest at the boundary area between the clamped portion of the torque-transmitting member and the portion thereof not subject to axial clamping pressure.

DESCRIPTION OF PREFERRED EMBODIMENTS OF THE INVENTION

Figures 1, 1A:
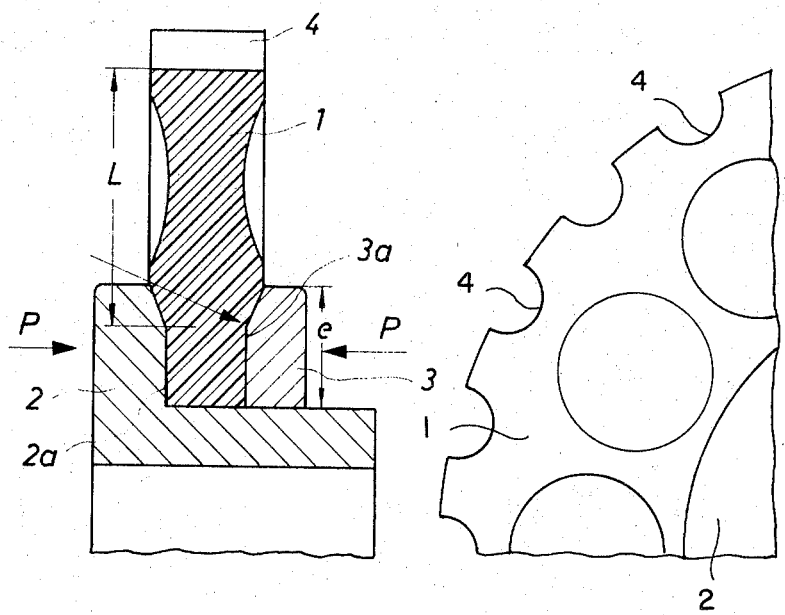
FIG. 1 is a vertical section of a flexible coupling embodying this invention and shows but the upper portion of the coupling, its lower portion being identical to its upper portion.
FIG. 1a is a side elevation of the structure of FIG. 1.

FIGS. 1 and 1a show a coupling structure embodying the invention in relatively diagrammatic fashion. For a more detailed description of this general type of couplings reference may be had to the copending patent application of Lothar Ernst et al., filed 4/22/71 Ser. No. 117,678 for FLEXIBLE COUPLINGS, now U.S. Pat. No. 3,678,708, assigned to the same assignee as the present patent application.

In FIGS. 1 and 1a reference numeral 1 has been applied to indicate a substantially disc-shaped torque-transmitting member of an elastomeric material, or rubber-like material, e.g., vulcanized rubber. The coupling member 2 has a coupling flange forming an abutment for one of the end surfaces of torque-transmitting member 1. Coupling member 2 is mounted on a shaft (not shown), e.g., coupling member 2 may be keyed to such a shaft. Reference character 3 has been applied to indicate a clamping means which is substantially ring-shaped and may be referred-to as clamping ring. The clamping means or clamping ring clamps the radially inner portion of torque-transmitting member 1 against the clamping flange of coupling member 2. Reference character 2a has been applied to indicate the interface between the clamping flange of coupling member 2 and the torque-transmitting member 1, and reference character 3a has been applied to indicate the interface between the clamping means, or clamping ring 3, and the torque-transmitting member 1. In order to achieve such clamping action the clamping ring or clamping means 3 may be subject to a force from right to left, as seen in FIG. 1, and indicated in FIG. 1 by the right arrow P. The force P may be exerted by hydraulic, pneumatic or electromagnetic means (not shown in the drawing). As an alternative applicable in instances where the coupling action is permanent, i.e., where there is no need to couple and uncouple a pair of shafts, the clamping means or clamping ring may be screwed against the coupling flange of the coupling member 2, and thus provide a constant clamping pressure in the direction of arrows P against the torque-transmitting member 1. The radially outer side of torque-transmitting member 1 is provided with axially extending grooves 4, intended to be engaged by a system of cooperating teeth forming part of a second coupling member (not shown) arranged in coaxial relation to coupling member 2, and rotatable around the same axis as coupling member 2, but mounted on another shaft than coupling member 2, coaxial to the shaft on which member 2 is mounted. Complete couplings of this description including a second radially outer coupling member have been disclosed in detail in the aforementioned copending patent application of Lothar Ernst et al., and reference may be had to this application for details not fully described in the present specification.

The torque-transmitting member 1 has the same axial length at its radially outer side and at its radially inner side before being clamped between parts 2 and 3. In other words, torque-transmitting member 1 has parallel equidistant end surfaces before being clamped between parts 2 and 3. Upon being clamped between parts 2 and 3 the axial length of torque-transmitting member 1 is reduced along the annular clamping surfaces. The reduction of axial width of torque-transmitting member 1 is largest where parts 2 and 3 have parallel surfaces engaging the torque-transmitting member 1, and the compression of the torque-transmitting member 1 decreases progressively, and its axial width increases progressively, where parts 2 and 3 have outwardly slanting or flaring surfaces engaging torque-transmitting member 1. Within the annular regions where the compression of torque-transmitting member 1 is largest, the coefficient of friction between member 1 and parts 2 and 3 is largest. Within the annular regions where the compression of torque-transmitting member 1 decreases gradually on account of the slanting or flaring out geometry of parts 2 and 3, the coefficient of friction between member 1 and parts 2 and 3 decreases progressively or gradually to zero. This progressive or gradual decrease of the coefficient of friction tends to greatly increase the useful life of torque-transmitting member 1 since it allows some limited slip of the torque-transmitting member 1 within the annular areas where the coefficient of friction between parts 1, 2 and 3 decreases.

In FIG. 1 reference character L has been applied to indicate the elastic length of torque-transmitting member 1, and reference character "e" has been applied to indicate the depth of clamping of torque-transmitting member 1 between parts 2 and 3. The depth of clamping e is subdivided in a radially inner zone where the coefficient of friction and the large clamping pressure exerted by parts 2 and 3 upon part 1 are so large as to virtually preclude any relative movement between parts 1 and 2, 3. The radially outer zone of the total depth of clamping e allows a limited relative movement between parts 1 and 2, 3 since the coefficient of friction and the clamping pressure decrease progressively, or gradually, where the parts 2 and 3 are slanting, flaring outwardly, or diverging.

Figure 2:
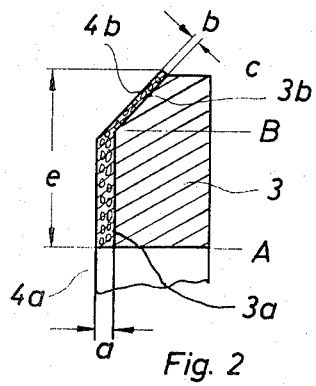
FIG. 2 shows a portion of the structure of FIG. 1, i.e., the clamping means or clamping ring of FIG. 1 on a larger scale than FIG. 1.

It is apparent from the foregoing that the structure of FIGS. 1 and 2 includes means for causing a progressive variation in radial direction of the coefficient of friction and of the clamping pressure between parts 1 and 2, 3. Other combinations of friction control by the geometry of parts 1, 2 and 3 combined with additional local coefficient of friction control means are illustrated in FIGS. 2 to 7.

The clamping ring 3 of FIG. 2 has the same geometry as the clamping ring of FIG. 1. The portion 3a of the interface between the clamping member or clamping ring 3 and the torque-transmitting member 1 which is at right angles to the axis of the coupling is provided with a layer or overlay 4a having a thickness "a" and the divergent portion 3b of that interface is provided with a layer or overlay 4b which has a thickness "b". The coefficient of friction of torque-transmitting member 1 and of layer 4a exceeds the coefficient of friction of torque-transmitting member 1 and layer 4b. The coupling flange of coupling member 2 is provided with two layers (not shown) that correspond in every respect to the layer 4a, 4b of clamping member or clamping ring 3. Thus the friction between parts 1 and 2, 3 decreases in radially outward direction very markedly on account of two reasons, i.e., (1) the configuration or geometry of parts 1, 2 and 3, and (2) the different surface action of layers or overlays 4a, 4b. In FIG. 2 the reference character e has been applied to indicate the depth of clamping of the torque-transmitting member. Reference character "A" has been applied to indicate the radially inner end of the clamping zone, reference character "B" has been applied to indicate the point where the clamping surfaces begin to diverge and the overlay 4a ends and the overlay 4b begins, and reference character "C" has been applied to indicate the point where the clamping area of the torque-transmitting member ends.

Figure 3:
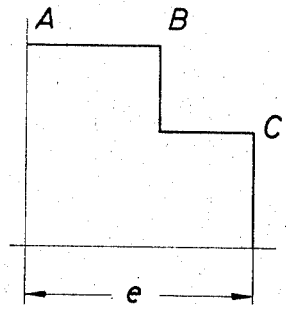
FIG. 3 is a diagrammatic representation of the distribution of the coefficient of friction in the structure of FIGS. 1 and 2.

FIG. 3 is a diagrammatic representation of the coefficient of friction between parts 1 and 2, 3 plotted against the depth of clamping e. FIG. 3 is merely intended to indicate in a general way that the coefficient of friction is relatively large between A and B, and relatively small between B and C. As a result, distortions and oscillatory motions of the torque-transmitting member which occur between B and C are not conducive to a relatively rapid disintegration of the torque-transmitting member.

Figure 4:
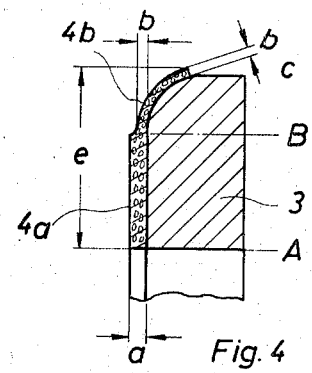
FIG. 4 shows a modification of the structure of FIG. 2 in the same fashion as FIG. 2.

The structure of FIG. 2 and that of FIG. 4 might be modified by substituting for overlays of different thickness having different coefficients of friction at different points thereof overlays having a uniform thickness, but different surface characteristics or different textures which result in a relatively large and in a relatively small coefficient of friction at different points of the torque-transmitting member.

The structure of FIG. 4 differs from that of FIG. 2 only by the substitution of the planar outwardly slanting portion of the clamping means or clamping ring 3 by an outwardly flaring portion having a predetermined radius. This portion is covered by a relatively thin layer 4b having the thickness b tending to increase the coefficient of friction but to a relatively limited extent, while the portion of clamping ring 3 at right angles to the axis of the coupling is covered by a relatively thick layer 4a having the thickness a tending to increase the coefficient of friction between the torque-transmitting member and the clamping ring 3 to a larger extent than the layer 4b having the thickness b. In FIG. 4 the reference characters e, A, B and C have the same significance as explained above in connection with FIG. 2.

While FIGS. 4-7, inclusive, refer to a clamping means or a clamping ring 3, it will be understood that the coupling flange of the coupling member 2 (FIG. 1) is intended to be a mirror image of the part 3 in any of the instances to which FIGS. 4-7 refer.

Figure 5:
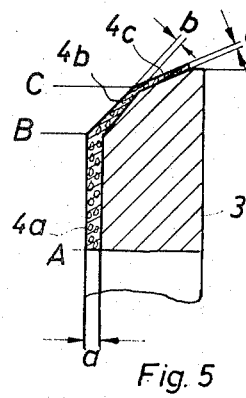
FIGS. 5 to 7, inclusive, show modifications of the structure of FIGS. 2 and 4 in the same fashion as FIGS. 2 and 4.

The clamping means of FIG. 5 include a clamping surface which is vertical to the axis of the coupling, a clamping surface which diverges radially outwardly relatively slightly, and another clamping surface which diverges radially outwardly to a larger extent than the first mentioned outwardly diverging clamping surface. The first mentioned clamping surface interface is covered with a friction layer or friction overlay 4a having the thickness a, the next interface is covered with a friction layer or friction overlay 4b whose thickness decreases from a to b; a > b; and the overlay 4c of the next interface decreases from b to c; c < b. The structure thus establishes three zones of progressively decreasing coefficient of friction and of progressively decreasing restraint of the movements of the torque-transmitting member relative to the coupling flange of coupling member 2 and relative to clamping ring or clamping means 3. The letters A, B, C and D in FIG. 5 indicate the beginning and the end, respectively, of each of the three different friction coefficient clamping zones achieved by that structure. In FIG. 5 the same overlay material is used for establishing all three clamping zones.

Figure 6:
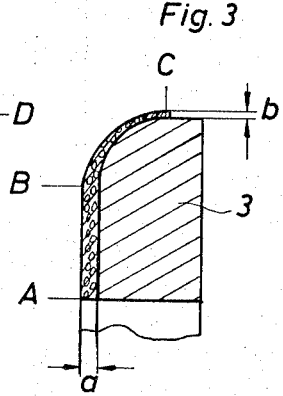

The clamping ring 3 of FIG. 6 has an outwardly flaring clamping zone on account of the radius of clamping member or clamping ring 3. The thickness of the friction overlay decreases continuously from the maximum thickness a at point A to the minimum thickness b at point C. There is a thickness at the intermediate point B less than a and in excess of b.

Figure 7:
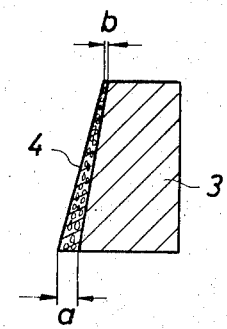

In the structure shown in FIG. 7 the clamping ring 3 has no clamping surface at right angles to the axis of the coupling. The entire clamping area of the clamping ring 3 is formed by an outwardly diverging plane. The interface 4' between that plane and the torque-transmitting member (not shown in FIG. 7) is covered by an overlay of a material which controls the coefficient of friction between the torque-transmitting member and the clamping ring 3. The thickness a of the overlay is largest where the pressure exerted by clamping ring 3 upon the torque-transmitting member is largest, and the thickness b of the overlay is smallest where the pressure exerted by clamping ring 3 on the torque-transmitting member is smallest. The friction overlay on clamping ring 3 is homogenous. In the structure of FIG. 7 the coefficient of friction decreases continuously in radially outward direction.

In cases where the danger of deformation of the torque-transmitting member is relatively limited, equal pressure may be exerted upon the torque-transmitting member along its entire clamping depth. In this case the coupling flange of the coupling member 2 and the clamping means or clamping ring 3 define a groove of rectangular cross-section for receiving the torque-transmitting member. The desired decrease of the coefficient of friction in radially outward direction may be achieved by the nature of the surface of the friction overlays. To be more specific, either the thickness of a uniform or homogenous friction overlay may be varied in the way shown in FIGS. 2, 4 and 5 to 7 or, as an alternative, the thickness of the friction overlay may be uniform in radial direction and the overlay may be composed of a plurality of annular coaxial friction overlays which are graded in such a way that the coefficient of friction decreases radially outwardly in discrete steps.

The friction overlay or overlays may be established by spraying the clamping surfaces of parts 2 and 3 with suitable friction-increasing materials. Friction overlays in layer-form may also be affixed to parts 2 and 3 by means of adhesives. In some instances it is possible to dispense entirely with friction overlays, and to control the coefficient of friction in the manner set forth above by imparting different degrees of coarsness or different textures to the metal surfaces which engage the torque-transmitting member. This may be achieved by mechanical action, but is preferably achieved by chemical action or corrosion, e.g., etching various surface elements of the coupling in different degrees.

We claim as our invention:

1. A flexible shaft coupling including a pair of coupling members of which one has a coupling flange, a substantially disk-shaped torque-transmiting member of a resilient material for transmitting torques from one to the other of said pair of coupling members and clamping means for clamping said torque-transmitting member against said coupling flange, said clamping means and said clamping flange having non-uniform surface characteristics within the regions thereof engaging said torque-transmitting member causing in radial direction a progressive variation of the coefficient of friction between said torque-transmitting member, said clamping flange and said clamping means.

2. A flexible shaft coupling as specified in claim 1 including means for causing formation of substantially concentric and annular areas having a varying coefficient of friction between said torque-transmitting member, said clamping means and said clamping flange, said coefficient of friction being largest at the radially inner surface elements and smallest at the radially outer surface elements of said clamping flange and of said clamping means.

3. A flexible shaft coupling as specified in claim 1 wherein said clamping means and said clamping flange are provided within the region thereof engaging said torque-transmitting members with overlays having non-uniform coefficients of friction.

4. A flexible shaft coupling as specified in claim 3 wherein the thickness of said overlays decreases radially and is largest at the points where the depth of clamping of said torque-transmitting member is largest.

5. A flexible shaft coupling as specified in claim 3 wherein said overlays have a non-uniform granular structure.

6. A flexible shaft coupling as specified in claim 1 wherein said surface characteristics causing a progressive variation of the coefficient of friction between said torque-transmitting member, said clamping means and said clamping flange are combined with such a configuration of said torque-transmitting member, said clamping means and said clamping flange that the clamping pressure is highest at regions where said coefficient of friction is highest.

7. A flexible shaft coupling as specified in claim 1 wherein the surfaces of said clamping means and of said clamping flange include diverging surface elements having a different texture at the radially inner portions and at the radially outer portions of said clamping means and of said clamping flange.

* * * * *